Dec. 27, 1966 J. F. MERRITT 3,294,912

STEREOPHONIC FM RECEIVERS HAVING AUTOMATIC SWITCHING MEANS FOR STEREO RECEPTION

Filed Feb. 27, 1963

INVENTOR.
JAMES F. MERRITT
BY Eugene M. Whitacre
Attorney

United States Patent Office 3,294,912 Patented Dec. 27, 1966

3,294,912

STEREOPHONIC FM RECEIVERS HAVING AUTOMATIC SWITCHING MEANS FOR STEREO RECEPTION

James F. Merritt, Trenton, N.J., assignor to Radio Corporation of America, a corporation of Delaware Filed Feb. 27, 1963, Ser. No. 261,265
7 Claims. (Cl. 179—15)

Figure 1:
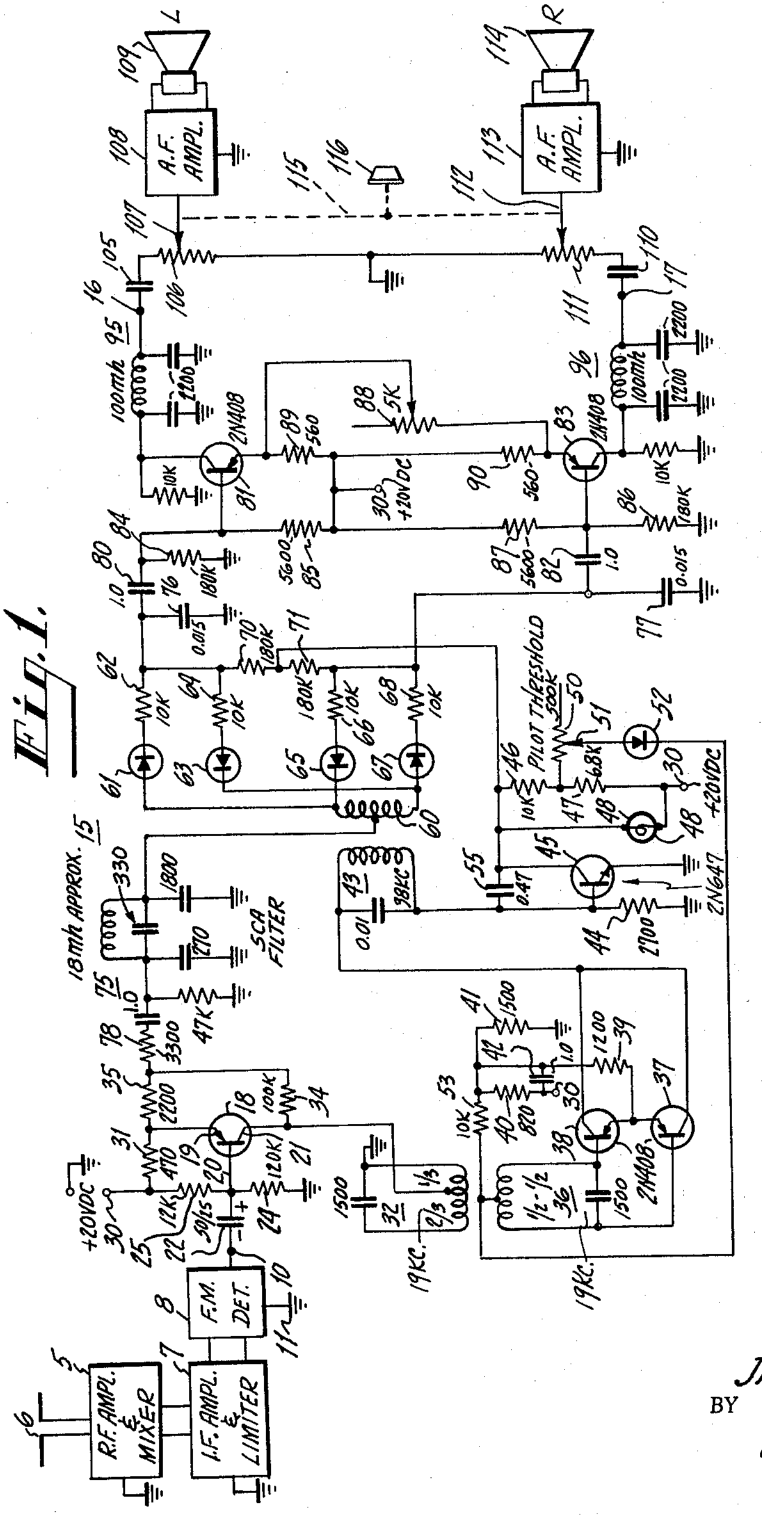

The present invention relates to stereophonic multiplex radio signal receivers, and more particularly to compatible stereophonic multiplex frequency-modulation (FM) radio receivers which operate in response to both monophonic and stereophonic signal information on a single modulated carrier wave.

In such receivers, under the present standards, the carrier wave is frequency-modulated by the sum of two stereophonically related audio frequency signals in the usual manner for FM broadcast and compatible reception by existing monophonic receivers. However, for stereophonic reception, the carrier wave further is simultaneously provided with stereophonic information effective for signal separation, in the form of a suppressed subcarrier signal which is amplitude-modulated with the difference of the two stereophonically-related signals to be transmitted, and a pilot signal for use in demodulating the suppressed subcarrier sideband.

The compatible composite stereophonic signal at the multiplex output circuit of a frequency-modulation detector of an FM receiver is thus composed of the main frequency-modulation signal component, which is the compatible signal used by an unmodified or monophonic frequency-modulation receiver, a 19 kc. (kilocycles per second) pilot signal, and sidebands representative the difference-frequency ($L-R$) signal extending from 23 kc. to 53 kc.

In general, two major types of multiplex demodulators have been used for demodulating the subcarrier sidebands and reconstructing the original stereophonic signals. In one type of system, the subcarrier sidebands and a demodulating wave derived from the 19 kc. pilot signal are fed to a synchronous detector to demodulate the subcarrier sidebands and obtain the ($L-R$) signal. The ($L-R$) signal is then combined with the ($L+R$) signal in suitable matrix circuitry to derive the original left and right signals. The other major type of system is referred to as the time division multiplex or switching system wherein the composite stereophonic signal is fed to a detector circuit together with a switching or demodulating wave derived from the pilot signal. In this type of system the composite wave is synchronously sampled to directly provide, the left and right output signals.

If adequate separation, or lack of cross-talk, between the resultant stereophonic signals is to be achieved and maintained, it is important that the phase of the demodulating wave be kept fixed with respect to that of the pilot signal over a wide range of signal receiving conditions.

When a frequency modulation station to which the receiver is tuned is not transmitting a pilot signal (19 kc.) and broadcasts monaural or single channel program material, or when the received stereophonic signals are too weak for proper stereophonic reproduction, it is desirable to automatically disable the subcarrier demodulation process and to translate the received transmissions as a monaural signal without appreciable distortion.

It is accordingly an object of this invention to provide an improved stereophonic multiplex unit for FM receivers.

A further object of this invention is to provide improved circuitry for regenerating the suppressed subcarrier from the pilot signal in a stereophonic multiplex unit for FM radio receivers, in which the phase of the regenerated subcarrier wave remains locked to that of the pilot signal over wide input signal variations to permit good separation between the stereophonic channels.

A still further object of this invention is to provide an improved stereophonic multiplex unit for use with an FM radio which automatically permits the translation of monaural or stereophonic transmissions without the need for manual switching.

Another object of the invention is to provide improved stereophonic-monaural switching circuitry which provides an indication of the mode of operation of the circuit.

In circuits embodying the invention the composite sterophonic signal from the FM receiver demodulator is fed to circuitry for separating the pilot signal from the remainder of the composite signal. The pilot signal is then fed to a frequency doubler circuit which may comprise a pair of transistors. Biasing circuit means are provided for maintaining the frequency doubler circuit substantially non-responsive to pilot signals which are below a predetermined threshold level. When the pilot signal amplitude exceeds the predetermined threshold level, the frequency doubler circuit operates to provide an output wave of twice the frequency of the pilot signal. The biasing circuit means is responsive to signal translation by the frequency doubler circuit to reduce the threshold biasing and thereby increase the gain of the frequency doubler circuit.

In accordance with one aspect of the invention, the biasing circuit means may comprise a transistor switch which controls the threshold biasing on the frequency doubler circuit, and also the application of power to an indicator lamp. When a pilot signal of sufficient amplitude is received and the transistor switch is actuated, the threshold biasing on the frequency doubler is removed, and the indicator lamp is energized to show that a stereophonic signal is being received.

In accordance with another aspect of the invention, the subcarrier detector may comprise a time division multiplex type detector including a plurality of diodes to which the composite stereophonic signal is applied. The regenerated subcarrier wave from the frequency doubler circuit alternately switches the diodes on and off to sample the composite wave to directly develop the original left and right stereophonic signals. During reception of monaural signals, when the frequency doubler is inoperative, the transistor switch causes a forward bias to be applied to at least some of the detector diodes to permit the translation therethrough of monophonic signals without appreciable distortion. During stereophonic signal reception, the bias is removed from the diodes to permit automatic balancing of the detector circuit with respect to the regenerated subcarrier wave as will be described hereinafter.

Figure 2:
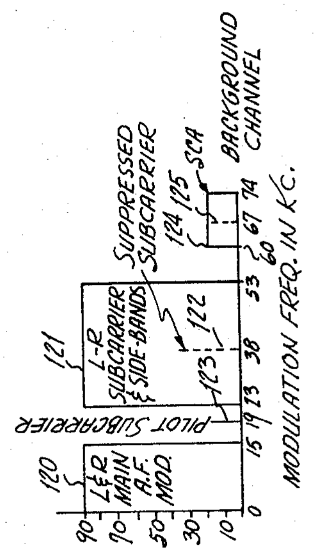

The novel features which are considered to be characteristic of this invention are set forth with particularity in the appended claims. The invention, itself, however, both as to its organization and method of operation as well as additional objects and advantages thereof will best be understood from the following description when read in connection with the accompanying drawings in which:

FIGURE 1 is a schematic circuit diagram of a stereophonic multiplex demodulator unit embodying the invention, shown in connection with an FM receiver and an audio amplifier in block form; and FIGURE 2 is a graph indicating the range of frequency spectrum and modulation components of a composite modulation signal as applied to the stereophonic multiplex unit of FIGURE 1, with reference to certain operating features of the invention.

Referring to the drawings and more particularly to FIGURE 1, the receiver circuit shown in block form is representative of a frequency modulation receiver adapted for stereophonic multiplex operation. In this respect it is provided with the usual R.-F. amplifier and mixer 5 tunable through the frequency-modulation band of 88 to 108 mc., and coupled to antenna means 6. The mixer 5 is coupled to an I.-F. amplifier and limiter 7 which is followed by a suitable FM detector 8. The FM detector 8 includes a pair of output terminals 10 and 11 across which are developed a composite signal comprising: the $(L+R)$ signals, the subcarrier sidebands representative of the $(L-R)$ signal and the 19 kc. pilot signal.

Connected with the multiplex output circuit or terminals 10–11 of the FM detector 8 is a stereophonic multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

In the stereo multiplex unit 15, a preamplifier signal amplifier stage is provided in connection with a transistor 18 having an emitter electrode 19, a base electrode 20 and a collector electrode 21. Signals from the FM detector 8 output terminals 10 and 11 are fed through a coupling network including a coupling capacitor 22 to the base electrode 20.

A voltage divider including the resistors 24 and 25 connected in series across the terminals of an operating potential supply source 30, sets the bias at the base 20 of the transistor 18 for substantially linear amplification. The transistor 18 operates as an emitter follower for the composite signal from the FM detector 8, and thus includes a load resistor 31 connected between the emitter and the positive terminal 30 of an operating potential supply source. In addition, the transistor 18 operates as an amplifier for the pilot signal, the amplifier load comprising a parallel resonant tank circuit 32 tuned to 19 kc. which connects the collector electrode 21 to ground.

A portion of the pilot signal appearing at the collector electrode 21 is fed back to the emitter electrode 19 through a pair of resistors 34 and 35 to buck-out 19 kc. components developed across the load resistor 31. This buck-out simplifies the problem of filtering the detector output signals to remove ultrasonic frequencies. Removal of the pilot signal from the composite signal also lessens the possibility of its intermodulation with the audio frequency signal components during the detection process.

The pilot signal components developed in the tank circuit 32 are coupled to a secondary circuit 36 which is also tuned to the pilot signal frequency. The secondary circuit 36 comprises the input circuit of a frequency doubler stage including a pair of transistors 37 and 38. The base electrodes of the transistors 37 and 38 are connected to opposite ends of the secondary circuit. The emitter electrodes of the two transistors are connected in common through a resistor 39 to a point of relatively fixed positive potential established by a voltage divider including the resistors 40 and 41. The junction point of the resistors 40 and 41 is bypassed to ground for 19 kc. signals by a capacitor 42. The terminal of resistor 40 remote from this junction point is connected to the source 30.

The output circuit for the frequency doubler stage comprises a resonant circuit 43, and a resistor 44 which are connected in series between the collector electrodes of the transistors 37 and 38 and ground.

Biasing circuit means for establishing the voltage which is applied to the base electrodes of the transistors 37 and 38 includes a switching transistor 45. The conductivity of the switching transistor 45 is controlled by the voltage developed across the resistor 44 which is directly connected between the base and emitter electrodes of the switching transistor. The collector electrode of the switching transistor 45 is connected through a pair of resistors 46 and 47 to the source of operating potential 30. In addition, a stereophonic-monaural indicator lamp 48 is connected between the collector of the switching transistor 45 and the positive terminal of the potential source 30.

One terminal of a pilot threshold potentiometer 50, which has an adjustable tap 51, is connected between the resistors 46 and 47, and the other terminal is left unconnected. The anode of a diode 52 is connected between the adjustable tap 51 and its cathode is connected to a center tap on the coupling winding in the tuned circuit 36 to control the bias voltage at the base electrodes of the transistors 37 and 38. As isolating resistor 53 connects the center tap of the coupling winding to the low signal potential side of the common emitter resistor 39.

The switching transistor 45 operates between a cut-off and fully conducting or saturated condition. The time constant required to effect this transition is controlled by the resistor 44 and the interelectrode capacitance between the base and collector electrodes of the switching transistor 45 as supplemented by an external capacitor 55.

The demodulating or switching voltage at 38 kc. developed in the tuned circuit 43 is coupled to a time division multiplex type detector circuit which is operative to derive the left (L) and right (R) signals directly from the composite signal. The detector circuit includes center tapped inductor 60 coupled to the resonant circuit 43. The left channel output signals are detected by a series connected diode 61 and resistor 62 connected to one end of the inductor 60 and a series connected diode 63 and resistor 64 connected to the other end of the inductor. Right channel signals are detected by a diode 65 and a series connected resistor 66 connected to said one end of the inductive winding 60, and a diode 67 and a series connected resistor 68 connected to said other end of the inductive winding 60. The right and left channel output terminals of the detector are connected by a pair of series connected resistors 70 and 71, the junction of which is connected to the collector of the switching transistor 45 to provide stereophonic-monaural switching of the detector circuit as will hereinafter be described.

The composite signal information appearing at the emitter electrode 19 of the preamplifier transistor is coupled by an SCA (Subsidiary Communications Allocation) filter 75 into the detector circuit at the center tap of the inductor 60. The 19 kc. pilot components are removed from the composite signal as described hereinabove. The filter has a linear phase response in its passband and severely attenuates the high-frequency SCA information. The filter 75 includes one inductor and has a three-pole, one-zero low-pass configuration with a null frequency placed at the most common SCA subcarrier frequency of 67 kc. The filter has equal source and load terminations. The load termination is formed by two resistors in parallel, the resistors 62 and 64 for one-half cycle of the 38 kc. switching signal, and the resistors 66 and 68 is the other half cycle of the 38 kc. switching signal. For frequencies above those which the SCA filter is supposed to suppress, the de-emphasis capacitors 76 (for load resistors 62, 64) and 77 (for load resistors 66, 68) short circuit the load resistors to ground. The source termination comprises a resistor 78, which also isolates the SCA filter from the pilot buck-out matrix, and resistors 31 and 35.

The 38 kc. switching voltage from the resonant circuit 43 is applied to the diodes 61, 63, 65 and 67 to synchronously sample the composite stereophonic signal applied at the center tap of the inductor 60. The diodes in the detector function as switches, closed for half a cycle and then open for half a cycle. When the switching signal is properly timed with respect to the composite signal, the diodes 61 and 63 yield information primarily left in content, and the diodes 65 and 67 yield information right in content. Some cross-talk is produced in the detector output channels as a result of the use of a wide sampling angle on a signal of time division multiplex character but with no higher order sidebands of its switching signal. This cross-talk may be expressed in detection efficiencies for $L+R$ and for $L-R$ components; the efficiency of the $L-R$ detection in an average detector being about 4 *db* less than the efficiency of the $L+R$ detection.

However, the wide sampling angle detector described possesses immunity to SCA cross-talk as compared to narrow angle sampling detectors such as synchronous peak detectors. The effective sampling waveform of a wide sampling angle detector should ideally contain no even harmonics of the switching signal. In actuality, very little of the 76 kc., or the second harmonic of the 38 kc., is introduced into the demodulation process where it could intermodulate with frequencies near 67 kc. (the SCA carrier) to produce audible beats. The detector described exhibits very little intermodulation distortion resulting from interaction of demodulated signals nearly subharmonic to the subcarrier frequency.

As will be noted, the circuit including the diodes 61 and 63 is balanced so that the 38 kc. switching signal does not appear in the left channel output. In like manner the circuit including the diodes 65 and 67 is balanced to prevent the switching signal from appearing in the right channel. The balanced feature of the detector simplifies the elimination of ultrasonic frequencies which are undesirable when the demodulated stereophonic signals are used to drive a magnetic tape recorder.

The demodulated left channel signals are de-emphasized by a de-emphasis network including the parallel resistors 62 and 64 and the capacitor 76 together with the shunt resistor 85. Likewise, the right signals are de-emphasized by a network including the parallel resistors 66 and 68 and the capacitor 77 together with the shunt resistor 87. The de-emphasis networks provide a 75 microsecond-time constant roll-off.

The left channel signals are coupled through a D.C. blocking capacitor 80 to the base electrode of the left channel matrix amplifier 81. The right channel signals are passed through a D.-C. blocking capacitor 82 to the base electrode of the right channel matrix amplifier 83. Biasing voltages are provided for the amplifiers 81 and 83 by voltage dividers including the resistors 84–85 and 86–87 respectively. The emitter electrodes of the transistors 81 and 83 are coupled by a variable resistor 88, and a pair of resistors 89 and 90. The junction of the resistors 89 and 90 is returned to the positive terminals of the potential supply source 30. Left and right output signals are derived from the collector circuits from the transistors 81 and 83 respectively and are fed through low-pass filters 95 and 96 which permit passage of signals in the desired audio frequency band while severely attenuating the pilot and other higher frequency signals.

Cross-talk appearing in the left and right signal channels due to the difference of the detection efficiencies between the $L+R$ and $L-R$ signal information as the result of wideband sampling in the detector circuit and as a result of high frequency roll-off in the SCA filter which attenuates the higher order subcarrier sidebands, is substantially removed by the matrix amplifiers 81 and 83. In effect, the matrix amplifiers 81–83 provide greater amplification of the $L-R$ components than of the $L+R$ components so that pure L and pure R signals are obtained in the collector of the transistors 81 and 83 respectively. The amount that the $L-R$ components are amplified more than the $L+R$ components is determined by the setting of the variable resistor 88.

The radio receiver signal translating system includes suitable means connected with the terminal 16 and 17 of the stereophonic multiplex unit to amplify and reproduce the left and right audio frequency signals. To this end, the terminal 16 is coupled to a capacitor 105 to an output volume control potentiometer 106 having an output volume contact 107 connected with a suitable audible frequency channel amplifier 108, as indicated, which has a common ground return connection and is connected to drive a left channel output loudspeaker 109.

Likewise, the output terminal 17 is coupled through a capacitor 110 to a second channel volume control potentiometer resistor 111 having an output volume control contact 112 connected to the second channel amplifier means 113, having a common ground return connection and a right channel output loudspeaker 114. As is customary, the volume control means are ganged for joint operation as indicated by the dotted line connection 115 and the common volume control knob represented at 116 in connection therewith. This dual channel signal translation circuit and sound reproducing output means therefore is representative of any suitable means of this type normally provided in a stereophonic sound reproducing system.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the abscissa and percentage modulation along the ordinate which also indicates relative amplitudes of subcarrier signals. It will be seen that the total signal is composed of an $(L+R)$ component 120 which may provide as much as 90% modulation and an $(L-R)$ double-sideband suppressed-carrier AM signal component 121 which may also modulate the carrier up to 90% as indicated. In other words when the component 120 is maximum the component 121 is minimum.

In the graph of FIGURE 2 it is assumed that the audio frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 122 is at 38 kc. and is the second harmonic of the 19 kc. pilot carrier represented at 123 and is maintained at a constant phase relationship. The sidebands of the suppressed subcarrier extend substantially from 23 kc. to 53 kc. as indicated, thereby to provide for substantially the full 15 kc. modulation referred to.

The possible SCA background music channel is indicated by the block 124 and extends 7 kc. on either side of a 67 kc. subcarrier signal indicated by the dotted line 125.

When a stereophonic FM signal is being received by the FM receiver (and assuming an SCA signal present), a composite signal as represented in FIGURE 2 is developed across the output terminals of the FM detector 8.

Reference is now made to the operation of the circuit shown in FIGURE 1. During the reception of monophonic signals or of stereophonic signal whose pilot signal level is below a predetermined threshold level, the switching transistor 45 is non-conductive thereby establishing the collector electrode thereof at a positive potential which is substantially that of the operating supply source 30. Thus, the voltage across the indicator lamp is substantially zero so that the lamp is extinguished indicating monaural reception. The positive voltage appearing at the collector electrode of the transistor 45 is applied to the anodes of the diodes 63 and 65 by way of the resistors 70–71 and a resistor 73 thereby biasing these diodes into their high conductance regions to permit the translation of monophonic signals through the diodes 63 and 65 without crossover distortion. For monophonic reception identical signals are applied to the amplifiers 81 and 83.

With the switching transistor 45 non-conductive, the voltage at the junction of the resistors 46 and 47, which is applied to the anode of diode 52, is nearly at the voltage of the operating potential supply 30 thereby forward biasing the diode 52. The diode 52 is thus conductive and causes the base electrode of transistors 37 and 38 to be biased at a potential which is positive with respect to the emitter electrodes. The amount by which the base electrodes of the transistors 37 and 38 are reverse biased with respect to their emitter electrodes is determined by the setting of the tap 51 of the potentiometer 50.

In practice, the tap 51 is set to a point such that the minimum threshold level of pilot signal which produces acceptable stereophonic reception, just overcomes the back bias on the doubler transistors 37 and 38. The peaks of this minimum threshold of pilot signal then cause pulses of current to flow through the transistors 37 and 38 which causes a voltage to be developed across the resistor 44 of a polarity to turn on the switching transistor 45. As the transistor 45 begins to conduct its collector voltage becomes less positive, thereby reducing the potential at the junction of the resistors 46 and 47, and hence reducing the reverse bias on the doubler transistors 37 and 38. The reduced reverse bias on the frequency doubler transistors 37 and 38 increases the gain thereof for the threshold level of pilot signal to further increase the turn-on voltage developed across the resistor 44. The net effect is a snap action wherein the transistor 45 quickly goes from a non-conducting to a saturated condition bringing the collector thereof to substantially ground potential. When the transistor 45 is saturated, the potential at the junction of the resistors 46 and 47, with reference to the fixed potential at the junction of the resistors 40 and 41, is such as to reverse bias the diode 52, thereby removing the threshold back bias from the transistors 37 and 38.

During the saturated condition of the switching transistor 45, the voltage at the junction of the resistors 47 and 48 is positive, but sufficiently less positive than the voltage at the center tap of the coupling winding 36 to insure that the diode 52 is back biased. The amount of the offset voltage is a function of the setting of the tap 51 on the potentiometer 50. This circuit has the advantage that a relatively small change in the conductivity of the switching transistor causes the diode 52 to become forward biased. Accordingly, this circuit insures that the transistor will positively switch from its non-conducting to its saturated condition, and will not seek some intermediate equilibrium point wherein the transistor can exceed its rated collector dissipation.

When the transistor 45 is saturated a voltage is applied across the indicator lamp indicating stereophonic reception. The positive voltage which is applied to the diodes 63 and 65 in the detector circuit during monophonic reception falls effectively to ground potential so that substantially no circuit current is bled through the diodes 63 and 65 to maintain balancing thereof with respect to the switching subcarrier so that the 38 kc. switching signal is balanced out and does not appear in the output circuits.

If the received pilot signal amplitude should fall below the predetermined threshold level, the frequency doubler circuit is still effective to provide high gain and doubling thereof to provide the switching signal. When the pilot signal falls a given amount below the predetermined threshold level, the switching transistor 45 begins to conduct less and thereby re-establishes the threshold bias on the frequency doubler transistor 37 and 38 and causes the circuit to convert automatically to the condition of monophonic reception. This action provides a hysteresis condition wherein a larger pilot signal threshold is required to activate the circuit for stereophonic signal reception than is required for the maintenance of the circuit in a stereophonic mode.

The stereophonic detector unit should operate in the monophonic reception mode when the set is being tuned between stations to prevent false and distracting illumination of the indicator lamp. This requirement necessitates that the subcarrier regeneration circuitry not be excited by the interstation noise fed into the stereophonic-detector unit. The high Q pilot separator transformer whose primary and secondary windings form part of the tuned circuits 32 and 36 respectively restricts the amount of energy that interstation noise can cause to appear on the bases of the frequency doubler transistors. The back bias on these transistor bases establishes a threshold which exceeds the average energy of the interstation noise appearing on them. The capacitor 55 from the collector to base of the switching transistor 45 forms a time constant with the resistor 44 which is quite long. This time constant keeps noise peaks from lighting the indicator lamp and prevents an audible thump in the stereo detector output circuits when the unit goes into its stereophonic mode of operation. The time constant is short enough so that a listener will not tune through a station without realizing that it broadcasts stereophonic information.

What is claimed is:

1. A circuit for frequency-modulation stereophonic receivers comprising:

an inpute circuit for connection to a source of demodulated frequency-modulation signals which during monophonic reception comprise audio-frequency signals and which during stereophonic signal reception includes: (1) audio-frequency signals, (2) subcarrier sideband signals. (3) a pilot signal, means for separating said pilot signal from the remainder of said composite signal, a frequency doubler circuit including a pair of transistors each having base, emitter and collector electrodes, means for applying said separated pilot signal in push-pull relation between the base electrodes of said pair of transistors, an output circuit coupled to the collector electrodes of said transistors for developing a demodulating signal whose frequency is twice the frequency of said pilot signal, biasing circuit means for establishing a severse threshold bias between the base and the emitter electrodes of said pair of transistors, whereby a predetermined threshold level of pilot signal is required for translation of said pilot signal by said transistors, means responsive to the translation of pilot signal by said transistors for reducing said threshold bias voltage level, and a detector coupled to receive signals from said input circuit and from the output circuit of said frequency doubler.

2. A circuit for frequency-modulation stereophonic receiver comprising:

an input circuit for connection to a source of demodulated frequency-modulation signals which during monophonic reception comprise audio-frequency signals, and which during stereophonic reception includes a composite stereophonic signal and a pilot signal, means for separating the pilot signal from the remainder of said composite signal, means including a pair of transistors arranged for push-pull application of said pilot signal for doubling the frequency of said pilot signal to develop a demodulating signal, a composite signal demodulator comprising first, second and third and fourth diodes, and a center tapped winding coupled to receive said demodulating signal, means for applying said composite signal to said center tap of said winding, means connecting said first and second diodes between opposite ends of said winding and one output terminal for said demodulator, means connecting said third and fourth diodes between opposite ends of said winding and another output terminal for said demodulator, said first and second diodes being oppositely poled with respect to said first output terminal and said third and fourth output terminals being oppositely poled with respect to said second output terminal, biasing circuit means for supplying a reverse threshold bias to said pair of transistors and for providing a forward bias to at least one of said diodes during monophonic signal reception, and switching means responsive to said pilot signal, for reducing said reverse threshold bias and for removing said forward bias during stereophonic signal reception.

3. A subcarrier regenerating circuit for frequency-modulation stereophonic receivers comprising:

a pair of transistors each having base, emitter and collector electrodes, an input circuit coupled between said base electrodes for applying pilot signal energy in push-pull relation therebetween, a resonant output circuit tuned to twice the frequency of said pilot signal and a resistor connected in series between said collector electrodes and said emitter electrodes, a switching transistor having base, emitter and collector electrodes, means connecting said resistor between the base and emitter electrodes of said switching transistor, resistance means and a source of operating potential connected between the collector and emitter electrodes of said switching transistor, and means including a diode connected between a point on said resistance means and the base electrodes of said first and second transistors for controlling the bias voltage applied to the base electrodes of said first and second transistors as a function of the conductivity of said switching transistor.

4. A subcarrier detector circuit for frequency-modulation stereophonic receiver comprising:

an input circuit for connection to a source of demodulated frequency-modulation signals which during monophonic reception comprises audio-frequency signals, and which during stereophonic reception includes a composite stereophonic signal and a pilot signal, means for separating the pilot signal from the remainder of said composite signal, means including a pair of transistors arranged for push-pull application of said pilot signal for doubling the frequency of said pilot signal to develop a demodulating signal, a composite signal demodulator comprising a plurality of rectifying devices and having a pair of output terminals, means for applying said composite signal to said composite signal detector, means for applying said demodulating signal to said composite signal detector to render said rectifying devices alternately conductive and non-conductive to synchronously sample said composite signal at times to derive separate stereophonically related signals at said output terminals, biasing circuit means for forward biasing at least one of said diodes during monophonic signal reception and for supplying a reverse threshold bias to said transistors, and, switching circuit means responsive to said demodulating signal for reducing said reverse threshold bias and for removing said forward biasing during stereophonic signal reception.

5. A subcarrier detector circuit for frequency-modulation stereophonic receivers comprising:

an input circuit connection to a source of demodulated frequency-modulation signals which during monophonic reception comprise audio-frequency signals, and which during stereophonic signal reception includes: (1) audio-frequency signals, (2) subcarrier sideband signals, (3) a pilot signal, means for separating said pilot signal from the remainder of said composite signal, a frequency doubler circuit including a pair of transistors each having base, emitter and collector electrodes, means including a center tapped winding connected between the base and emitter electrodes of said pair of transistors coupled to receive said separated pilot signals, an output circuit coupled to the collector electrodes of said transistors for developing a demodulating signal whose frequency is twice the frequency of said pilot signal, biasing circuit means connected between the center tap of said winding and the emitter electrodes of said transistors to apply a bias potential between the base and the emitter electrodes of said pair of transistors, and a detector coupled to receive signals from said input circuit and from the output circuit of said frequency doubler.

6. A subcarrier detector circuit for frequency-modulation stereophonic receiver comprising:

an input circuit for connection to a source of demodulated frequency-modulation signals which during monophonic reception comprises audio-frequency signals, and which during stereophonic reception includes a composite stereophonic signal and a pilot signal, means for separating the pilot signal from the remainder of said composite signal, means for doubling the frequency of said pilot signal to develop a demodulating signal, a composite signal demodulator having first and second output terminals for stereophonically related signals, and comprising first, second and third and fourth diodes, and first, second, third and fourth resistors, and a center tapped winding coupled to receive said demodulating signal, means for applying said composite signal to said center tap of said winding, said first diode and said first resistor connected in series between one end of said winding and said first output terminal for said demodulator, said second diode and said second resistor connected in series between the other end of said winding and said first output terminal, said first and second diodes being oppositely poled with respect to said first output terminal, said third diode and said third resistor connected in series between said one end of said winding and said second output terminal, said fourth diode and said fourth resistor being connected in series between said other end of said winding and said second output terminal, said third and fourth diodes being oppositely poled with respect to said second output terminal, the time constant of the diode circuits and the amplitude of said demodulating signal being such as to provide substantially 180° conduction angle of said diodes whereby a cross-talk component is produced at said first and second terminals, and matrix circuit means including first and second matrix amplifiers coupled to said first and second terminals and adjustable bias means coupled to said amplifiers to reduce the amount of cross-talk produced as a result of said wide conduction angle of said diodes.

7. A subcarrier regenerating circuit for frequency-modulation stereophonic receivers comprising:
- a pair of transistors of one conductivity type each having base, emitter and collector electrodes,
- an input circuit coupled between said base electrodes for applying pilot signal energy in push-pull relation therebetween,
- a resonant output circuit tuned to twice the frequency of said pilot signal and a resistor connected in series between said collector and emitter electrodes,
- a switching transistor of an opposite conductivity type having base, emitter and collector electrodes,
- means connecting said resistor between the base and emitter electrodes of said switching transistor, and direct current conductively connecting the base electrode of said switching transistor to the collector electrodes of said pair of transistors,
- resistance means and a source of operating potential connected between the collector and emitter electrodes of said switching transistor, and
- means including a diode connected between a point on said resistance means and the base electrodes of said first and second transistors for controlling the bias voltage applied to the base electrodes of said first and second transistors as a function of the conductivity of said switching transistor.

References Cited by the Examiner

UNITED STATES PATENTS

| | | | |
|---|---|---|---|
| 3,070,662 | 12/1962 | Eilers | 179—155 |
| 3,167,615 | 1/1965 | Wilhelm et al. | 179—155 |
| 3,175,041 | 3/1965 | Shottenfeld et al. | 179—155 |

DAVID G. REDINBAUGH, *Primary Examiner.*

ROBERT L. GRIFFIN, *Examiner.*